United States Patent
Brenner et al.

(10) Patent No.: US 6,233,080 B1
(45) Date of Patent: May 15, 2001

(54) CROSSTALK-FREE SIGNAL SOURCE FOR DENSE WAVELENGTH DIVISION MULTIPLEXED SYSTEMS

(75) Inventors: Tomas Brenner, Severna Park; Paul A. Morton, West Friendship; Daniel Xiaoxing Zhu, Millersville, all of MD (US)

(73) Assignee: CIENA Corporation, Linthicum, MD (US)

(*) Notice: Subject to any disclaimer, the term of this patent is extended or adjusted under 35 U.S.C. 154(b) by 0 days.

(21) Appl. No.: 09/140,182

(22) Filed: Aug. 26, 1998

(51) Int. Cl.[7] ............................................. H04B 10/04
(52) U.S. Cl. ......................... 359/181; 359/161; 359/180; 359/187
(58) Field of Search ................................... 359/161, 180, 359/181, 187

(56) References Cited

U.S. PATENT DOCUMENTS

| | | | |
|---|---|---|---|
| 5,225,922 | * 7/1993 | Chraplyvy et al. | 359/124 |
| 5,528,707 | * 6/1996 | Sullivan et al. | 385/2 |
| 5,663,824 | * 9/1997 | Koch et al. | 359/184 |
| 5,694,504 | * 12/1997 | Yu et al. | 385/45 |
| 5,771,257 | * 6/1998 | Takiguchi et al. | 372/50 |
| 5,943,152 | * 8/1999 | Mizrahi et al. | 359/187 |
| 6,111,681 | * 8/2000 | Mizrahi et al. | 359/187 |

* cited by examiner

Primary Examiner—Leslie Pascal
Assistant Examiner—Hanh Phan
(74) Attorney, Agent, or Firm—Daniel N. Daisak; David L. Soltz

(57) ABSTRACT

An optical device is provided which locks the wavelength output of a laser transmitter in an optical transmission system as well as preventing the propagation of unwanted signals generated by the laser transmitter prior to the transmitter reaching the desired operating wavelength thereby reducing crosstalk between channels within a wavelength division multiplexed communication system.

19 Claims, 3 Drawing Sheets

CROSSTALK-FREE SIGNAL SOURCE FOR DENSE WAVELENGTH DIVISION MULTIPLEXED SYSTEMS

FIELD OF INVENTION

The present invention generally relates to optical communication systems and more particularly to an apparatus for providing a crosstalk-free signal source for dense wavelength division multiplexed communication systems.

BACKGROUND OF INVENTION

Wavelength division multiplexing (WDM) is a technique for increasing the capacity of existing fiber optic networks. In a WDM system, plural optical channels are carried over a single waveguide, each channel being assigned a particular wavelength. Through the use of optical amplifiers, such as rare earth doped fiber amplifiers, these optical channels are directly amplified simultaneously, facilitating the use of WDM systems in long-distance optical networks. Dense WDM or DWDM systems are also employed which have a greater number of optical channels with smaller channel spacings.

The transmitters used in WDM systems typically include semiconductor lasers, for example Distributed Feedback lasers (DFB), where each laser transmits light at a designated one of a plurality of wavelengths. DFB lasers generally comprise one or more III-V semiconductor materials and are commercially available. Each laser outputs an optical carrier signal at a particular channel wavelength usually within the 1.55 µm range which corresponds to an absorption minimum associated with silica-based fibers.

When a laser transmitter used in a WDM system is first turned on, it experiences a "ramp-up period" where the drive current must first increase to a level where the semiconductor laser provides light at the desired wavelength and at operating power. During this ramp-up period, the laser transmitter is not yet emitting light at the desired wavelength, however light still propagates down the transmission fiber. In addition, during transmitter operation, the laser output may drift off-channel allowing unwanted light to propagate down the fiber. In either case, this unwanted light transmission may adversely impact adjacent channel performance and compromise the integrity of the transmitted information signals.

To control the output power and frequency of each laser in a WDM system, a laser controller is used to provide the required laser bias current as well as thermal control of the laser. By using thermal control which can be responsive to feedback information from a wavelength reference, the temperature of the laser diode can be adjusted so that the reference signal remains stable or at a peak, thereby maintaining the precise operating frequency of the laser.

In order to achieve high bit-rate transmission over long distances, the DFB laser sources used in DWDM communication systems are modulated externally with an information signal. This is because externally modulated DFB lasers have relatively low wavelength chirp as compared with laser diodes being directly modulated. An exemplary external modulator, such as a Mach-Zehnder modulator, employs a waveguide medium, whose refractive index changes according to the applied electrical field, i.e., the refractive index of an electro-optic material such as $LiNbO_3$ can be changed by applying an external voltage. In a Mach-Zehnder configuration, two optical interferometer paths are provided where an incoming optical carrier is split between the two paths. In the absence of an external voltage, the optical fields in the two paths constructively interfere. When an external voltage is applied, the refractive index in the waveguides is altered which induces a phase shift that produces destructive interference at its output.

When a $LiNbO_3$ modulator is employed with a semiconductor light source in a WDM system, it would be advantageous to turn the modulator off in order to prevent the transmission of unwanted light from propagating down the optical fiber. Once the drive current would increase to a level where the laser provides light at the desired channel wavelength at the operating power, the modulator may be modulated to produce the desired information signals. However, $LiNbO_3$ modulators without attenuators retain an unwanted electrostatic charge in the off-state which distorts the output signal which may then propagate down the transmission fiber and cause bit errors at the receiving end.

This can be seen with reference to FIG. 1 which represents a digital bit stream of ones and zeros modulated by a typical $LiNbO_3$ modulator. A true "on" state representing a one bit corresponds to a voltage level of $V_{ON}$ and a true "off" state representing a zero bit corresponds to a voltage level of $V_{OFF}$. As stated above, a $LiNbO_3$ modulator retains an unwanted electrostatic charge such that the voltage level in the "off" state corresponds to $V_0$. Similarly, when the $LiNbO_3$ modulator is in the "on" state, the voltage level corresponds to $V_1$. In other words, this retained charge produces a voltage level which distorts the output signal representing a one or a zero in the digital bit stream which may cause bit errors at the receiving end, thereby compromising signal integrity.

Thus, there is a need to provide a simple and cost effective optical device which provides a crosstalk-free signal source for multiple wavelength optical transmission systems.

SUMMARY OF INVENTION

The present invention meets these needs and avoids the above-referenced drawbacks by providing an optical device to stabilize the output frequency of a laser transmitter and insuring the integrity of the modulated signal. The optical device in accordance with the present invention includes a light source for generating a light signal at a particular wavelength and a light modulation element coupled to the light source. The light modulation element has an associated "on" and "off" state such that when the light modulation element is in the "on" state, the light signal generated by the light source at the particular frequency is allowed to propagate along an optical transmission path, and when the light modulation element is in the "off" state, the light modulation element prevents light from propagating along the optical transmission path.

The optical device in accordance with the present invention also includes a filtering element coupled to the light modulation element. The filtering element has a transmissivity characteristic as a function of wavelength which defines a transmission band corresponding at or near the particular wavelength. A control circuit is also included which is coupled to the filtering element and to the light source. The control circuit receives a portion of the light signal at or near the particular wavelength transmitted by the filtering element. The control circuit generates a control signal, based on a portion of the light signal, for controlling the output power and temperature of the light source.

The foregoing, and other features and advantages of the present invention, will be apparent from the following description, the accompanying drawings and the appended claims.

DETAILED DESCRIPTION

In accordance with the present invention, an optical device is described which provides a crosstalk-free signal source for wavelength division multiplexed systems. A filtering element is used for providing a portion of an optical signal to a control circuit used to lock the output of the signal source.

Figure 2:
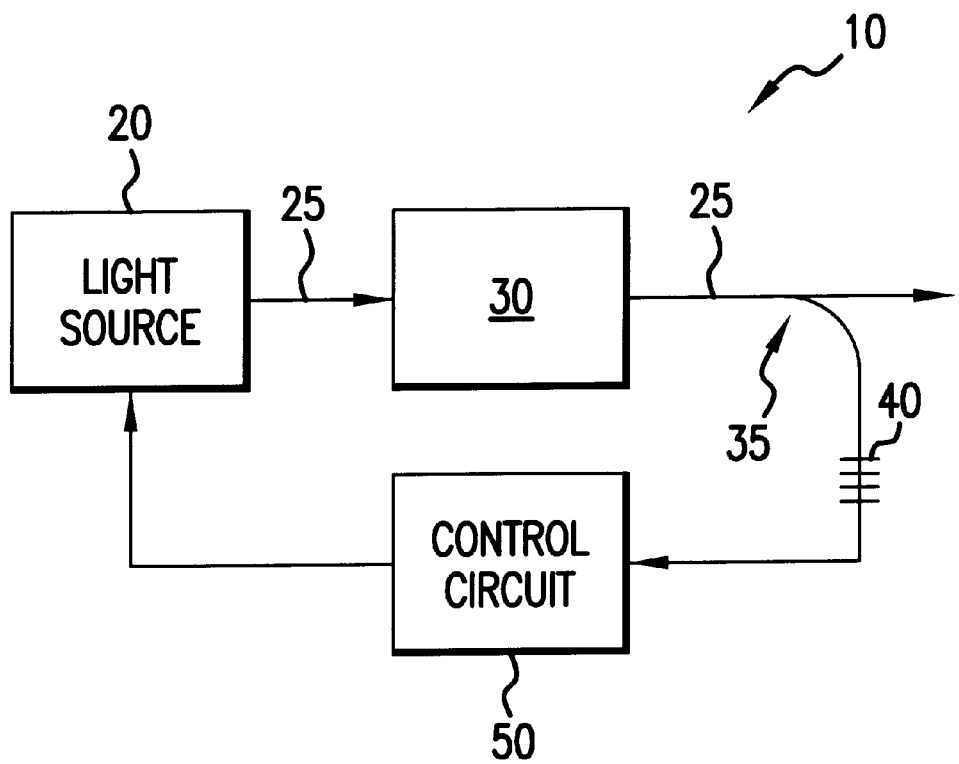
FIG. 2 is a schematic illustration of an optical device in accordance with the present invention.

FIG. 2 schematically illustrates an optical device 10 in accordance with the present invention wherein light source 20 is coupled to the input of a light modulation element 30 along transmission path 25. Device 10 can be, for example, a transmitter for a particular channel frequency within a wavelength division multiplexed (WDM) or dense WDM communication system. Light source 20 can be, for example, a DFB semiconductor diode laser generally comprising one or more III-V semiconductor materials commercially available. The laser light source outputs an optical carrier signal at a particular channel wavelength typically in the 1550 nm range.

Light source 20 is coupled to light modulation element 30 by way of optical transmission path 25 which is typically a single-mode silica-based fiber with an absorption minimum in the 1550 nm range. However, any optical waveguide which is capable of transporting an optical channel can be employed as transmission path 25. Alternatively, light source 20 and light modulation element 30 are monolithically integrated, thereby alleviating the need for transmission path 25 disposed between light source 20 and light modulation element 30.

Figure 3:
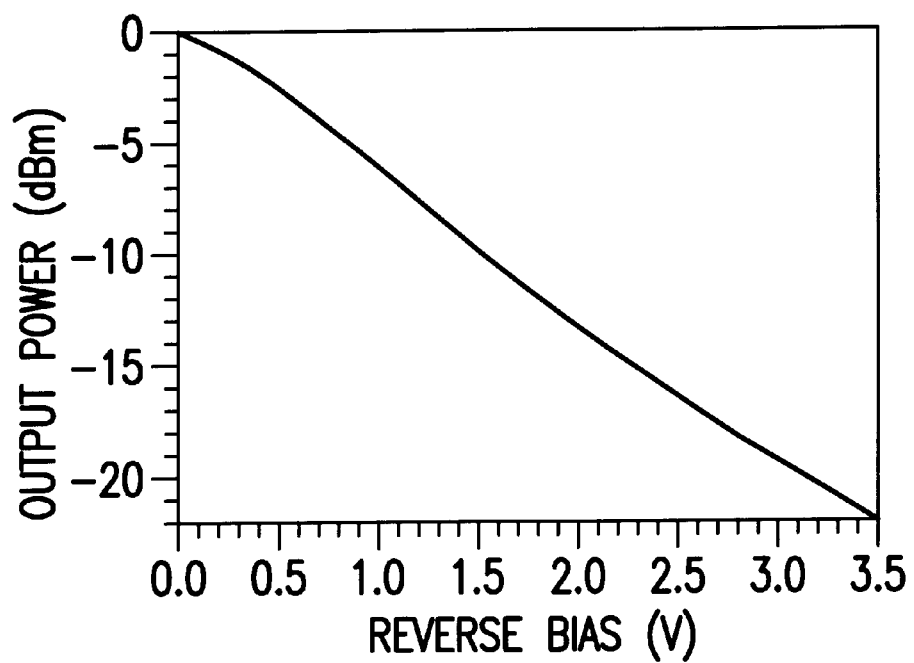
FIG. 3 illustrates output power of a typical electroabsorption modulator as a function of the reverse bias applied to the modulator

Light modulation element 30 can be, for example, a semiconductor electroabsorption ("EA") modulator formed on an InP substrate used to modulate light generated by source 20 with information signals. Among different types of optical modulators, semiconductor electro-absorption modulators consisting of III/V compound semiconductors are promising candidates for optical communication system. This type of external modulator is based on large field-induced variations in absorption coefficient due to either the Franz-Keldysh effect in double heterostructure, or the quantum confined Stark effect in multiple quantum-well structure. The modulators can be easily integrated monolithically with semiconductor lasers by using butt-coupling, selective area growth, vertical-mode coupling or quantum-well inter-diffusion techniques to realize compact and stable sources for data transmission. FIG. 3 illustrates output power of a typical EA modulator as a function of the reverse bias applied to the modulator. As can be seen, more than 20 dB attenuation can be obtained at 3.5 volts reverse bias.

Generally, an EA modulator is configured such that when the modulator is in the "off" state, light from source 20 does not propagate down fiber 25. This is advantageous when light source 20 is in the ramp-up stage i.e. where light source 20 is first turned on and the drive current has not reached the associated level where the source produces light at the desired wavelength and at peak power. During this ramp-up period, light modulation element 30 is in the "off" state, thereby preventing light produced by source 20 from propagating down fiber 25. Once the laser generates light at the desired output wavelength, the laser is locked by control circuitry 50 as described in more detail below. In other words, the light modulation element 30 is biased "off" while laser 20 stabilizes to the desired output power and operating frquency.

A splitter 35, for example a 95/5 tap, is coupled to transmission path 25 to direct a small percentage of the signals output by light modulation element 30 to filtering element 40. In this manner, a portion of the modulated signal is used to control the output of light source 20, as described below, and the majority of the modulated signal propagates along transmission path 25. Exemplary optical splitters include 1×N wideband single mode and fused fiber splitters, both of which are commercially available.

A filtering element 40 is coupled along path 25 and is configured to transmit the desired signal wavelength and reflect wavelengths outside the transmission band. In an exemplary embodiment, filtering element 40 can be a Bragg grating comprising a series of photoinduced refractive index perturbations in an optical fiber which reflects optical signals within a selected wavelength band and transmits wavelengths outside of the selected wavelength band. Bragg gratings suitable for use in the optical system in accordance with the present invention are described in, for example, Morey et al., "Photoinduced Bragg Gratings in Optical Fibers," *Optics and Photonics News*, February 1994, pp. 8–14.

Figure 4:
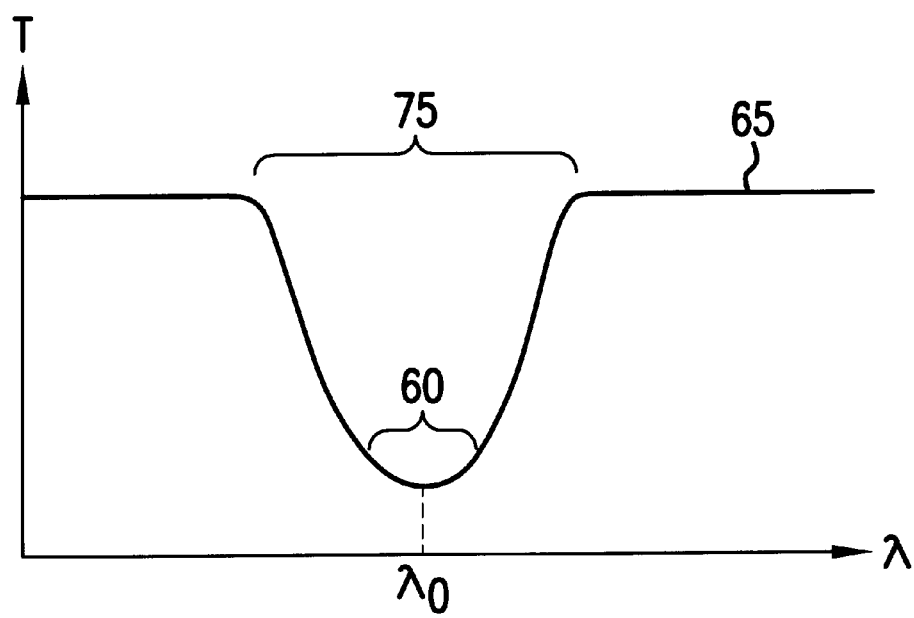
FIG. 4 illustrates the transmittance vs. wavelength characteristic of an exemplary filtering element in accordance with the present invention.

FIG. 4 illustrates a transmission characteristic 65 of an exemplary Bragg grating as filtering element 40 which is relatively high for wavelengths greater than or less than a particular operating wavelength $\lambda_o$ generated by light source 20. During the ramp-up period for light source 20, light modulation element 30 is turned off preventing wavelengths outside the operating wavelength from reaching filtering element 40 via coupler 35. Once the operating current of light source 20 is reached, thereby producing a signal at the desired wavelength, light modulation element 30 is turned "on" and the output of source 20 is modulated with an information signal. The output wavelength of light source 20 may still vary depending on, for example, variations in laser bias current and/or the temperature of light source 20. However, these variations are typically close to $\lambda_o$, i.e. within portion 60 of transmissivity curve 65, and most of the light received by grating 40 is reflected back to transmission path 25 via splitter 35. The portion of the light which is transmitted by filtering element 40 is supplied to control circuitry 50.

Control circuitry 50 is coupled to light source 20 and is used to control the output wavelength and power of the light source based on a portion of the signal output by light modulation element 30 via tap 35 and grating 40. For example, where light source 20 is a semiconductor laser, circuitry 50 generates output signals which control the temperature control current supplied to the laser, thereby adjusting the output of the laser to remain within portion 75 of transmissivity curve 65 shown in FIG. 2. Control circuitry 50 can include hardware and/or software configurations. Typically, control circuitry 50 can include one or more photodetectors for receiving the transmitted signals from filtering element 40. The photodetectors generate electrical signals in response to these received optical signals which are then used to control the output of light source 20. Examples of these types of control circuitry are included in application Ser. No. 08/848,423 entitled "Laser Wavelength Control Device" assigned to the assignee of the present invention and an application entitled "Laser Wavelength Control Under Direct Modulation" filed on Jul. 22, 1997 (Ser. No. 08/898,714) also assigned to the assignee of the present invention, both of which are incorporated herein by reference. In this manner, filtering element 40 and control circuit 50 are used to lock the output wavelength and power of light source 20.

Figure 1:
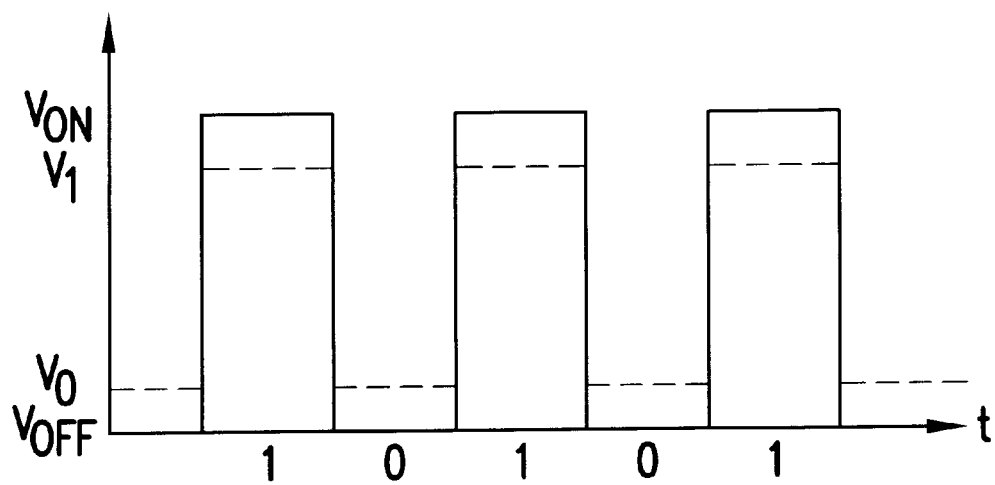
FIG. 1 represents a digital bit stream of ones and zeros modulated by a typical LiNbO$_3$ modulator
Figure 5:
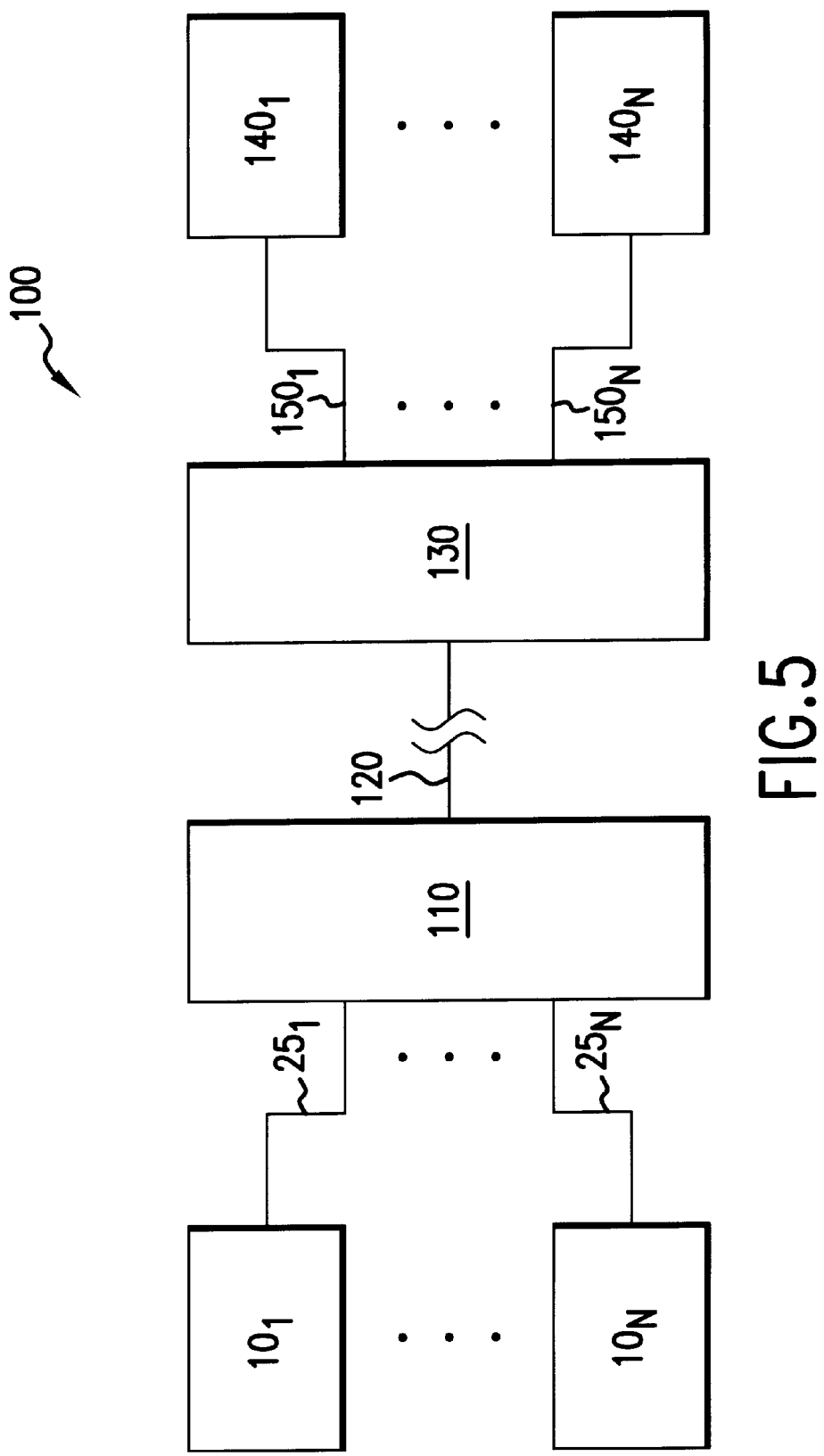
FIG. 5 is a schematic illustration of a transmission system employing a plurality of optical devices described with reference to FIG. 2.

FIG. 5 illustrates a simplified optical communication system 100 in which a plurality of optical devices $10_1 \ldots 10_N$ are used to provide optical signals at particular wavelengths modulated with information for transmission over an optical fiber. As described above with reference to FIGS. 1 and 2, each optical device $10_1 \ldots 10_N$ is configured to supply a modulated optical channel to transmission paths $25_1 \ldots 25_N$, respectively. Each optical channel carries information at an associated data rate and particular wavelength with appropriate frequency spacings, for example 100, 50, 25 GHz therebetween. Mulitplexer 110 can be an N×1 or N×2 (for protection switching) multiplexer configured to receive the plurality of optical channels and output a wavelength division multiplexed optical signal onto transmission path 120. Typically, when optical transmission path 120 is used as a long-haul carrier route, transmission path 120 is on the order of hundreds of kilometers long with optical amplifiers spaced approximately every one hundred kilometers, with a range of 30–130 kilometers being exemplary. Transmission path 120 is coupled to demultiplexer 130 used to separate the received multiplexed signal and supply the respective optical channels to N receiving units $140_1 \ldots 140_N$ via transmission lines $150_1 \ldots 150_N$, respectively. By employing optical devices $10_1 \ldots 10_N$ at the transmitting end of system 100 and biasing "off" the respective light modulation elements until the laser sources stabilize, crosstalk between channels within the multiplexed signal is reduced.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device for reducing crosstalk associated with a plurality of optical channels in a communication system comprising:

a light source for generating a light signal at a particular wavelength, said light source having a ramp-up period in which said light source does not substantially emit the light signal at the particular wavelength; and a light modulation element coupled to said light source, said light modulation element having an "on" and "off" state such that when said light modulation element is in said "on" state, said light signal generated by said light source at said particular wavelength is substantially allowed to propagate along an optical transmission path, and when said light modulation element is in said "off" state, said light modulation element substantially prevents said light signal from propagating along said optical transmission path, said light modulation element being in the off state during the ramp-up period of said light source to substantially prevent the light signal at a wavelength other than the particular wavelength from propagating along said optical transmission path.

2. The optical device in accordance with claim 1 further comprising:

a filtering element coupled to said light modulation element, said filtering element having a transmissivity characteristic as a function of wavelength, said transmissivity characteristic defining a transmission band corresponding at or near said particular wavelength; and a control circuit coupled to said filtering element and to said light source, said control circuit receiving a portion of said light signal at or near said particular wavelength transmitted by said filtering element, said control circuit generating a control signal, based on said portion of said light signal for controlling the wavelength and power outputted by said light source.

3. The optical device in accordance with claim 2 wherein said filtering element is an in-fiber Bragg grating.

4. The optical device in accordance with claim 2 wherein said light modulation element is a variable attenuator.

5. The optical device in accordance with claim 2 further comprising an optical splitting element coupled to said transmission path, said splitting element configured to tap said portion of said light signal at or near said particular wavelength.

6. The optical device in accordance with claim 2 wherein said control circuit further comprises a photodetector for receiving said portion of said optical signal and generating an electrical signal in response thereto.

7. The optical device in accordance with claim 6 wherein said control circuit comprises a processor for receiving and processing said electrical signal.

8. The optical device in accordance with claim 1 wherein said light modulation element is an electroabsorption modulator.

9. The optical device in accordance with claim 8 wherein said electroabsorption modulator and said light source are monolithically integrated.

10. The optical device in accordance with claim 1 wherein said light source is a distributed feedback laser.

11. An optical communication system comprising:

a light source generating a light signal at or near a particular wavelength when said light source is in a stabilized condition and at other wavelengths when said light source is not in the stabilized condition;

a modulation element optically communicating with said light source along a transmission path, said modulation element having a transmit condition and a nontransmit condition, wherein when said light source is in the stabilized condition said modulation element is in said transmit condition such that said light signal generated by said light source is allowed to propagate along said transmission path, and wherein when said light source is not in the stabilized condition said modulation element is in said nontransmit condition such that said modulation element substantially prevents said light signal at one of the other wavelengths from leaking into said optical transmission path;

a partially reflective element optically communicating with said modulation element; and a control circuit optically communicating with said partially reflective element and said light source, said control circuit configured to detect a portion of said light transmitted through said partially reflective element and generating an output signal in response thereto, said output signal used to adjust said wavelength of said light signal.

12. The optical device in accordance with claim 11 wherein said output signal is used to adjust a power level associated with said light source.

13. The optical device in accordance with claim 11 wherein said modulator element is a semiconductor electroabsorption modulator.

14. The optical device in accordance with claim 11 wherein said partially reflective element is a Bragg grating.

15. The optical device in accordance with claim 11 wherein said light source is a first light source generating a first light signal at a first wavelength, said modulation element is a first modulation element, said transmission path is a second transmission path, said partially reflective element is a first partially reflective element and said control circuit is a first control circuit, said optical system further comprising:

a second light source generating a second light signal at or near a second particular wavelength;

a second modulation element optically communicating with said second light source along a second transmission path, said second modulation element having a transmit condition and a nontransmit condition such that when said second modulation element is in said transmit condition, said second light signal generated by said second light source is allowed to propagate along said second transmission path, and when said second modulation element is in said nontransmit condition, said second modulation element prevents said second light source from leaking into said second optical transmission path;

a second partially reflective element optically communicating with said second modulation element; and a second control circuit optically communicating with said second partially reflective element and said second light source, said second control circuit configured to detect a second portion of said second light transmitted through said second partially reflective element and generating an output signal in response thereto, said output signal used to adjust said second wavelength of said second light signal.

16. The optical device in accordance with claim 15 wherein said first and second transmission paths optically communicating with an optical multiplexer configured to supply said first and second optical signals to an optical waveguide.

17. The optical device in accordance with claim 16 wherein said first light signal transmitted by said first modulation element at said first wavelength and said second light signal transmitted by said second modulation element at said second wavelength are such that said first signal at said first wavelength does not cause crosstalk with said second signal at said second wavelength along said optical waveguide.

18. The optical device in accordance with claim 15 wherein said second modulation element is a semiconductor electroabsorption modulator.

19. The optical device in accordance with claim 15 wherein said second partially reflective element is a Bragg grating.

* * * * *